J. P. LEONARD.
FOOTBOARD HOLDER FOR AUTOMOBILES.
APPLICATION FILED DEC. 19, 1919.
1,396,856.
Patented Nov. 15, 1921.
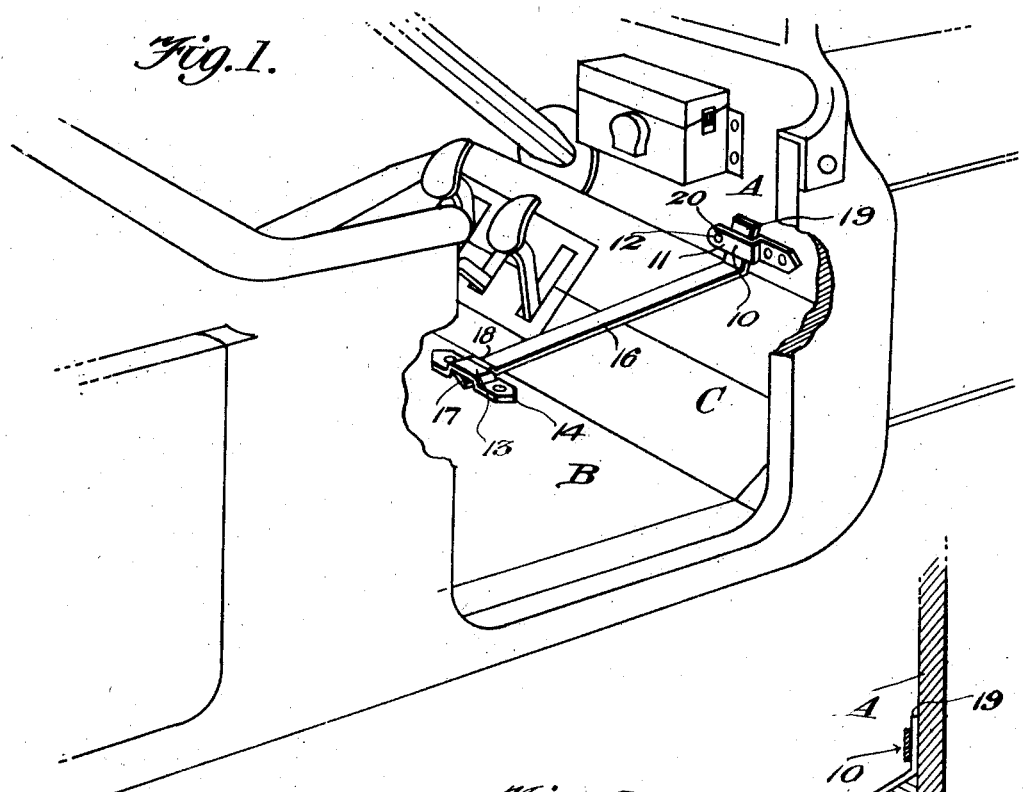
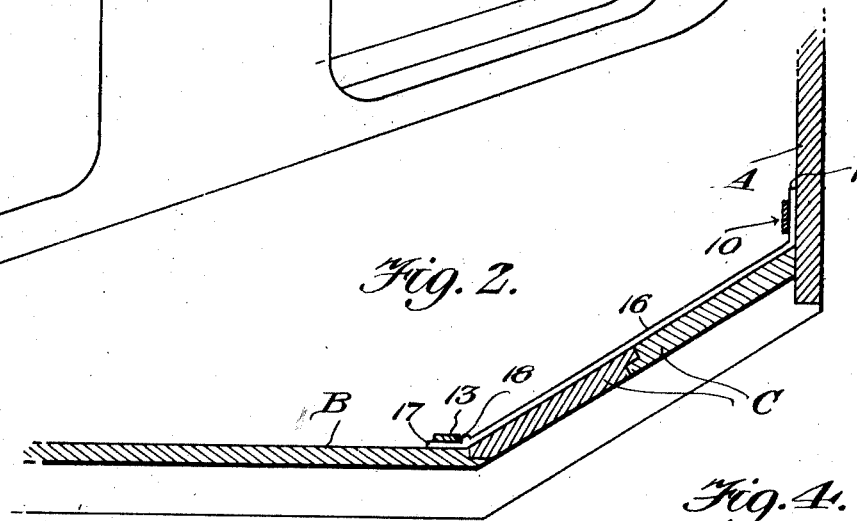
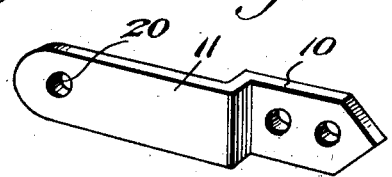
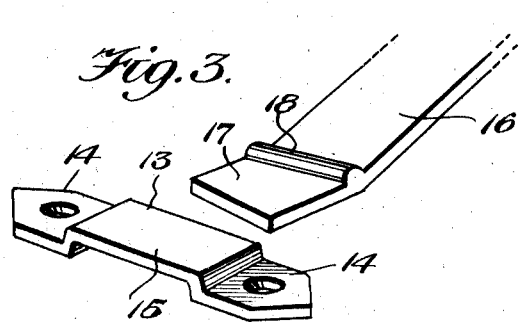
INVENTOR
John P. Leonard
BY Victor J. Evans
Att'y

UNITED STATES PATENT OFFICE.

JOHN P. LEONARD, OF HAWLEY, PENNSYLVANIA.

FOOTBOARD-HOLDER FOR AUTOMOBILES.

1,396,856. Specification of Letters Patent. Patented Nov. 15, 1921.

Application filed December 19, 1919. Serial No. 345,952.

*To all whom it may concern:*

Be it known that I, JOHN P. LEONARD, a citizen of the United States, residing at Hawley, in the county of Wayne and State of Pennsylvania, have invented new and useful Improvements in Footboard-Holders for Automobiles, of which the following is a specification.

This invention relates to attachments for automobiles and has for its object the provision of a device adapted to be attached to the dash and main floor board and engage the foot boards whereby to hold them firmly in position and prevent them from dropping down and interfering with the action of the control pedals of the automobile.

An important object is the provision of a device of this character which may be readily engaged or disengaged so as to permit removal of the floor boards when desired for the purpose of permitting access to the transmission case or for any other reasons.

An additional object is the provision of a device of this character which will be very simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawing in which—

Figure 1 is a perspective view showing the front portion of the body of an automobile looking toward the dash from the inside and showing my device in position, Fig. 2 is a detail sectional view through the floor board, foot boards, and dash, Fig. 3 is a detail perspective view of the floor board engaging end of my device, and, Fig. 4 is a detail perspective view of the bracket upon the dash.

Referring more particularly to the drawing, the letter A designates the dash of an automobile, B designates the main floor board which is horizontal, and C designates the foot boards which are inclined and disposed between the floor board and the dash.

In carrying out my invention I provide a bracket 10 secured upon the dash and having an offset end portion 11 which is provided with a hole 12.

Disposed upon the floor board B and secured thereto is a bracket 13 having attaching ears 14 and the offset central portion 15.

The numeral 16 designates an elongated bar of malleable iron or other suitable material which is disposed diagonally of the floorboards and which has one end angularly inclined, as shown at 17, for engagement within the bracket 13 and this end 17 is provided in its upper face with a diagonal rib 18. The other end of the bar is angularly inclined, as shown at 19, for engagement beneath the offset end 11 of the bracket 10.

In the use of the device the brackets being in position, the end 17 of the bar 16 is engaged within the bracket 13 and the rib 18 will prevent actual disengagement. The bar is then swung to engage the inclined end 19 within the bracket 10, after which a suitable screw 20 is passed through the hole 12 and into the dash for holding the bar 16 against movement.

From the foregoing description and a study of the drawing it will be apparent that I have thus provided a simple and efficient device for holding the footboards of an automobile against movement so that they will be prevented from falling down and interfering with the action of the control pedals.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

In a motor vehicle, the combination with a stationary horizontal floor board, the dash, and a plurality of removable inclined footboards between the floor board and the dash; of means for securing the removable foot boards comprising a loop-like bracket member secured upon the horizontal floorboard, a bar having a deflected end engaged within said bracket and formed with a rib limiting its insertion through the bracket, an open ended bracket on the dash in which the other end of said bar is engageable, said second named end being angularly deflected, and said second named bracket being formed with a hole for the passage of a securing member whereby to prevent removal of the bar.

In testimony whereof I affix my signature.

JOHN P. LEONARD.